United States Patent Office 2,854,400
Patented Sept. 30, 1958

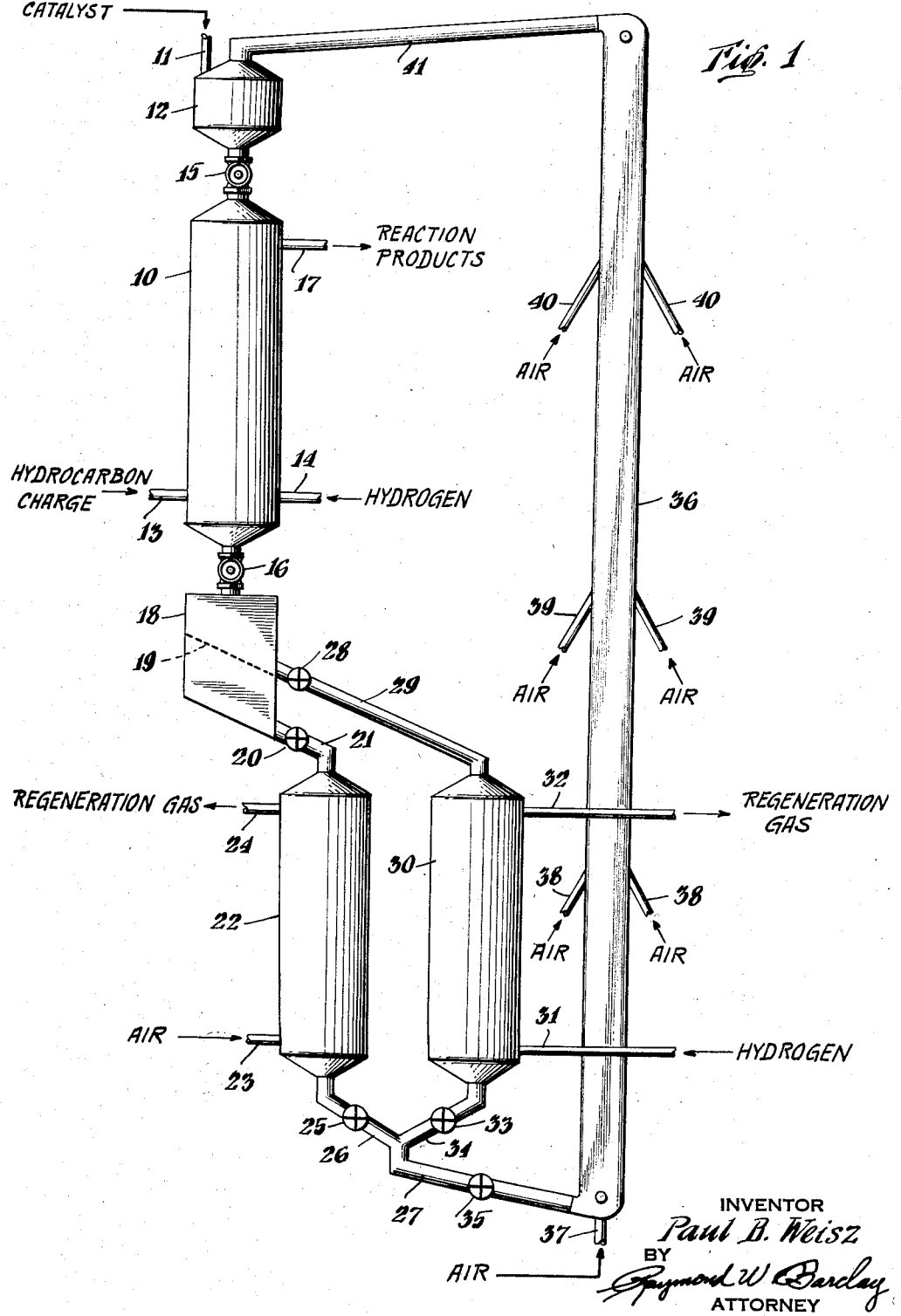

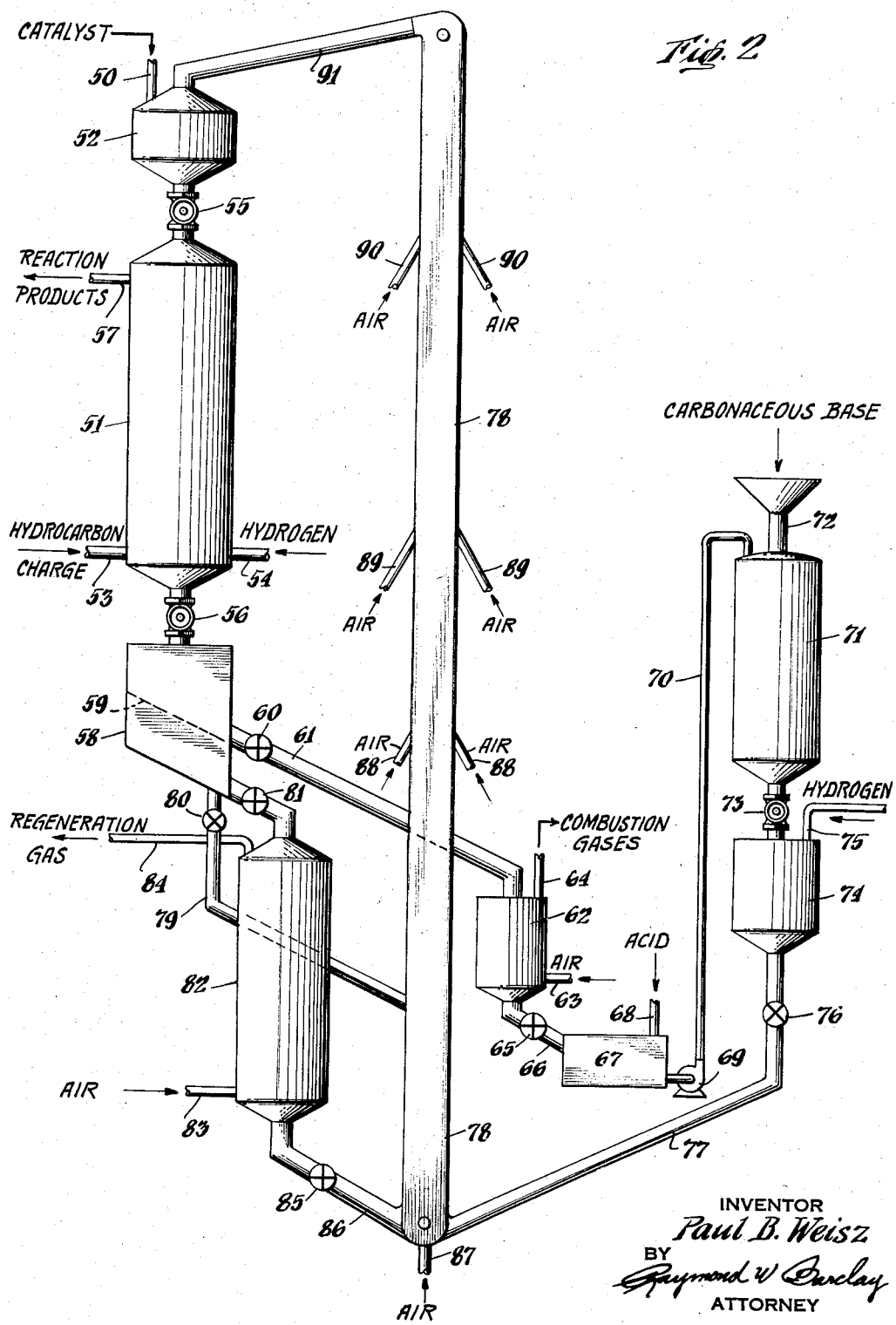

2,854,400

CATALYTIC CONVERSION OF HYDROCARBONS WITH SEPARATE REGENERATION OF THE SEVERAL COMPONENTS

Paul B. Weisz, Pitman, N. J., assignor to Socony Mobil Oil Company, Inc., a corporation of New York Application July 13, 1954, Serial No. 442,975

7 Claims. (Cl. 208—111)

This invention relates to catalytic conversion operations, to the catalyst employed therein, and to means for regenerating the catalyst after use in such operations.

It has heretofore been known to carry out hydrocarbon conversion operations in the presence of a catalytic composite of two or more chemically combined components to control the direction and extent of desired conversion. Thus, in hydrocarbon conversion reactions such as isomerization, aromatization, reforming, dehydrogenation, hydrogenation, hydrocracking, etc., wherein a hydrocarbon charge is contacted in the presence of hydrogen with a catalyst under conversion conditions of time, temperature, and pressure, it has heretofore been common practice to employ a catalyst comprising a component having cracking activity impregnated or otherwise chemically combined with a component having dehydrogenation activity. Exemplary of the catalysts which have been used in such reaction are composites of silica and/or alumina combined with small quantities of platinum. In some instances, the silica and/or alumina component has been previously treated with a small amount of halogen and thereafter combined with platinum. Such catalysts, while generally exhibiting the desired activity, have been attended by distinct operational disadvantages, one of which resides in the regeneration of the catalyst and more specifically in the recovery of the valuable platinum constituent from the spent catalyst.

It is an object of the present invention to afford a process for carrying out the aforementioned hydrocarbon conversion reactions in the presence of a catalyst unattended by the previous difficulties in catalyst regeneration. It is a further object of this invention to carry out such reactions in the presence of catalyst, permitting a wide freedom of choice in the base material upon which the valuable metal constituent, for example platinum, is deposited. It is still another object of this invention to provide a catalyst which affords easy and effective means for catalyst regeneration.

The above and other objects which will be apparent to those skilled in the art are achieved by means of the catalyst and process described herein. In accordance with the present invention, it has been discovered that hydrocarbon conversion can be effected in the presence of two chemically distinct catalytic substances which, although chemically not combined, are simultaneously present as mechanical mixtures in the reaction zone and thereby produce a new catalytic activity, different and beyond that obtainable from the simple addition of separate reaction on the two components. For example, a mechanical mixture of two types of particles, one containing platinum deposited on an inert carrier and one of the family of cracking catalysts, has been found to produce isomerization of paraffin hydrocarbons although this reaction proceeds to a negligible extent on either of the components alone. Such mechanical mixtures have been found, in accordance with the instant invention, to afford catalysts quite analogous, in so far as activity is concerned, to the platinum impregnated cracking catalyst composites heretofore employed.

Without being limited by any theory, it is believed that the success achieved with the mechanical catalyst mixture employed in this present process is attributable to the conversion reactions involved, tending to proceed by way of olefinic intermediates. Thus, the two reactions important in reforming, namely paraffin isomerization and aromatization, are believed to be accomplished by the following reaction steps:

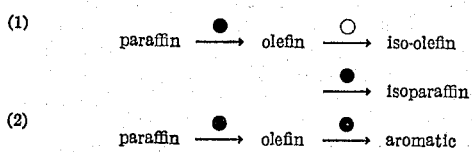

It is believed that each reaction step marked by ● takes place on a dehydrogenation center, typical of which is platinum; while each step marked by ○ takes place on an acid cracking catalyst center. In addition, the olefinic intermediates so formed have a sufficient lifetime to allow the two components to be located apart from each other in a chemically uncombined state within the same catalyst particle or even as separate catalyst particles situated within the same reaction zone.

Thus, in accordance with the present invention, isomerization of saturated hydrocarbons has been found to be effected by procedure (1) above upon passing the paraffinic reactant over a mechanical mixture of platinum dispersed on silica gel particles and commercial particle form silica-alumina cracking catalyst. In Table I below, the data for a typical reaction for obtaining isohexanes from n-hexane are shown over a catalyst composed of a mixture of the aforesaid components and over each of the components individually. In these reactions, the charge consisted of n-hexane which was passed over the catalyst at a liquid hourly space velocity of 1, employing a $H_2/HC$ ratio of 5:1, atmospheric pressure, and a temperature of 370° C.

Table I

| Example | Catalyst | Iso-hexanes in Product, Mol Percent of Charge |
|---|---|---|
| 1 | 10 cc. Pt on $SiO_2$ | 0.9 |
| 2 | 10 cc. $SiO_2$—$Al_2O_3$ | 0.3 |
| 3 | Mixture of above two | 6.8 |

The Pt on $SiO_2$ component was prepared by contacting silica gel having a packed density of 0.41 gram/c. c. with an aqueous solution of chloroplatinic acid of such concentration that after filling the pore volume with this solution and drying the solid, retention of the desired amount of platinum was attained. In the above examples, a component containing 0.78 wt. percent of platinum on silica gel was employed.

The $SiO_2$—$Al_2O_3$ component was a commercial silica-alumina cogel cracking catalyst containing 10 wt. percent of alumina, having a cracking activity, as determined by the CAT–A method, of 42. Cracking activity is conventionally expressed in terms of the percent by volume of a standard hydrocarbon charge which is cracked under specific condition in the "CAT–A" test. The method of such test is described in National Petroleum News, 36, page P. R.-537 (August 2, 1944).

The two types of catalyst particles had a screen size of 14–20 mesh (Tyler). The catalyst used in Example 3 was obtained by mechanically mixing for a few minutes the catalyst components of Examples 1 and 2.

The result achieved in accordance with Example 3 shows the non-additive and unexpectedly cooperative catalytic action of a physical mixture of the two types of catalyst particles.

In like manner, the unique cooperative action of the above catalyst mixture is demonstrated by the catalytic aromatization of alkylcyclopentanes. It is contemplated, in accordance with present findings, that this reaction is accomplished by successive reactions on the two catalyst components as illustrated by the following procedure:

(3)

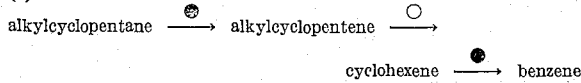

cyclohexene ⊕⟶ benzene where ⊕ and ○ have the above-noted significance.

In Table II below are shown the results of typical runs employing a charge of methylcyclopentane for the catalyst mixture described above and for the individual components thereof. In these examples a liquid hourly space velocity of 1, a $H_2/HC$ ratio of 6:1, atmospheric pressure, and a temperature of 510° C. were employed.

Table II

| Example | Catalyst | Benzene, Mol Percent of Charge |
|---|---|---|
| 4 | 10 cc. Pt on $SiO_2$ | 0.6 |
| 5 | 10 cc. of $SiO_2$—$Al_2O_3$ | 0.06 |
| 6 | Mixture of above two | 4.8 |

The above results again establish that there is clearly a non-additive cooperative action between the cracking and dehydrogenation components of the mechanical catalyst mixture utilized in the conversion processes of the instant invention. Thus, catalytic conversion of $C_6$–$C_7$ petroleum cuts to aromatic chemicals, benzene, toluene, etc., may be readily achieved inasmuch as the platinum component effects aromatization of cyclohexane rings and the mechanical mixture of the platinum component and cracking component produces aromatics from the cyclopentanes which constitute the normally difficult portions of a petroleum charge for obtaining high aromatic yields.

The dehydrogenation component of the present catalyst mixture exhibits reforming activity in that its use in connection with naphthas converts some of the charge to aromatics of higher octane number. It has recently become recognized that optimum octane numbers and yields are obtainable by addition of isomerization reactions to such aromatization. That such addition of isomerization is accomplished by the use of the mixed catalyst system described hereinabove is shown by the results of runs set forth in Table III below. In these runs, n-hexane was used as the charge stock under reforming conditions to effect both aromatization and isomerization. Thus, in carrying out these reactions, a liquid hourly space velocity of 1, a $H_2/H.$ C. ratio of 5:1, a temperature of 448° C. and atmospheric pressure were employed. The catalyst compositions were identical with those used in the previous examples. The unique cooperative result of using the mixture of dehydrogenation and cracking components for the addition of isomerization reactions is demonstrated by the following results:

Table III

| Example | Catalyst | Products (Wt. Percent of Charge) | |
|---|---|---|---|
| | | Iso-hexanes | Benzene |
| 7 | 10 cc. Pt on $SiO_2$ | 5.8 | 6.7 |
| 8 | 10 cc. $SiO_2$—$Al_2O_3$ | 0.9 | 0.0 |
| 9 | Mixture of above two | 13.7 | 5.3 |

It has been established, in accordance with the present invention, that the types of chemical activity of the mixtures of dehydrogenation and cracking components described herein are comparable with those obtainable over conventional reforming catalysts in which the dehydrogenation component, for example platinum, is combined by impregnation with a base exhibiting cracking activity.

In Table IV below is shown a direct comparison of the products obtained for reacting n-hexane to accomplish both isomerization and aromatization when the dehydrogenation component, i. e., platinum, is combined by impregnation with the cracking base and when it is located separately on particles of an inert support. The catalyst wherein platinum was combined by impregnation with the cracking base consisted of 0.49 wt. percent of platinum impregnated on a silica-alumina gel containing 10 wt. percent $Al_2O_3$, having a surface area of 38 square meters per gram and a packed density of 0.67 gram/cc. This was combined with an equal volume of silica gel having a surface area of 461 square meters per gram and a packed density of 0.41 gram/cc. The catalyst mixture wherein platinum was located on an inert support consisted of 0.78 wt. percent of platinum on silica gel characterized by a surface area of 461 square meters per gram and a packed density of 0.41 gram/cc. mixed with separate particles of silica-alumina cogel cracking catalyst containing 10 wt. percent of alumina and having a surface area of 38 square meters per gram and packed density of 0.64 gram/cc. In carrying out these reactions, a liquid hourly space velocity of 1, a $H_2/HC$ ratio of 5:1, a temperature of 440° C., and atmospheric pressure were employed.

Table IV

| Example | Catalyst | Iso-hexanes | Benzene | Olefins | Methylcyclopentane |
|---|---|---|---|---|---|
| 10 | 8.0 cc. Pt on $SiO_2$—$Al_2O_3$ +8.0 cc. $SiO_2$. | 5.3 | 2.4 | 8.8 | 1.6 |
| 11 | 8.0 cc. $SiO_2$—$Al_2O_3$+8.0 cc. Pt on $SiO_2$. | 6.8 | 4.0 | 7.1 | 2.8 |

It is evident from the data that both the desired aromatization and isomerization take place when the platinum is located on particles separated from the acid cracking particles and, in fact, the total product yield is higher in this instance.

In Table V below is shown a comparison of the reaction obtained with a conventional reforming catalyst of silica-alumina gel impregnated with platinum and with a mechanical mixture of particles containing platinum deposited on activated carbon and particles of silica-alumina cracking catalyst. The conventional reforming catalyst consisted of 0.30 wt. percent of platinum impregnated on a silica-alumina gel base containing 10 wt. percent $Al_2O_3$, having a surface area of 71 square meters/gram and a packed density of 0.70 gram/cc. The mechanical mixture of catalyst consisted of equal volumes of activated carbon having a packed density of 0.44 impregnated with 0.97 wt. percent of platinum and silica-alumina cogel cracking catalyst containing 10 wt. percent $Al_2O_3$ and having an activity index (CAT–A method) of 42. It is to be noted, that with the platinum concentrations and catalyst volumes employed and the respective packed densities for the activated carbon and silica-alumina bases, the total amounts of platinum in the reactor are comparable for each case, being 42 milligrams for the conventional catalyst and 43 milligrams for the mechanical mixture catalyst. The charge employed was n-hexane. A liquid hourly space velocity of 1, a $H_2/HC$ ratio of 5:1, a temperature of 440° C., and atmospheric pressure were utilized in carrying out the reactions.

Table V

| | Catalyst | |
|---|---|---|
| | 20 cc. Pt on SiO$_2$—Al$_2$O$_3$ | 10 cc. Pt on Carbon+10 cc. SiO$_2$—Al$_2$O$_3$ |
| Conversion | 51.6 | 63.6 |
| Liquid Yield | 89.0 | 90.5 |
| Iso-hexanes | 24.5 | 20.8 |
| Benzene | 4.9 | 14.6 |
| Olefins | 7.6 | 6.2 |
| Methylcyclopentanes | 2.6 | 6.6 |
| n-Pentane | .7 | 3.8 |
| Others | 1.4 | 3.3 |

It will be seen from the above data that the mechanical mixture of catalyst particles compared favorably with the conventional catalyst in catalyzing the desired isomerization and aromatization reactions and, in fact, afforded a greater overall convertion that obtained with the conventional catalyst.

In hydrocracking, as in the above reactions, evidence has been obtained indicating that a two-step mechanism on two independent types of catalyst sites leads to the desired products. It is believed that the two-step cracking mechanism proceeds as follows:

(A) Saturated gas oil molecules are dehydrogenated to high molecular weight olefins on metal catalyst sites, and (B) High molecular weight olefins crack very readily on acid cracking centers to gasoline range products, which are again hydrogenated on metal catalyst.

The collaborative but independent action of the metal and the acid sites in low temperature cracking has been established by data set forth in Table VI below. Thus, neither an acid silica-alumina cogel cracking catalyst containing 10 wt. percent Al$_2$O$_4$ and having an activity index (CAT-A method) of 42 nor platinum, 0.91 percent by weight, supported on activated carbon alone accomplish cracking of a saturated hydrocarbon charge at 700° F., while the mechanical mixture of these two types of particles converted 30% of the charge to products boiling in the gasoline range. The hydrocarbon charge employed was cetane. The reaction conditions involved a liquid hourly spaced velocity of 1, a H$_2$/HC ratio of 5:1, a temperature of 700° F., and atmospheric pressure. The results are shown below:

Table VI

| Example | Catalyst | Percent Vol. Gasoline (410° F. EP) |
|---|---|---|
| 12 | SiO$_2$—Al$_2$O$_3$ | <1 |
| 13 | Pt on Activated Carbon | <1 |
| 14 | Mixture of above two | 27 |

The independent action of the two catalyst components shown by the data set forth in Tables I–VI hereinabove establishes that the choice of support for the metal component is not restricted to an acid cracking base such as heretofore conventionally employed. The results further establish that the principle of separately located dehydrogenation and acid cracking components is general. The mechanical mixture of the two components may be used in the form of separate discrete particles introduced in the mixed stage into a stationary or moving bed reactor. The two components may, if desired, be more intimately contacted by grinding to small particle size and pelleting the mixture. The two components are also capable of being used as separate small particles in a fluidized state.

While platinum has been employed as the illustrative dehydrogenation component, other of the platinum metals, such as palladium, osmium, iridium, ruthenium, rhodium, and alloys of these metals may be used with effective results. Also other metals of the transition series of the periodic table may be employed, including chromium, nickel, iron, cobalt, manganese, vanadium, titanium, scandium, copper, zinc, zirconium, columbium, ytterbium, molybdenum, silver, masurium, rubidium, cadmium, the rare earths, hafnium, tantalum, gold, mercury, tungsten, actinium, thorium, and uranium. Compounds of the foregoing metals which exhibit dehydrogenation activity may also be found useful in some instances. Such compounds include the metal oxide, sulfide, halide, telluride, selenide, phosphate, manganate, chromate, molybdate, and bichromate. The dehydrogenation component is generally deposited on the surface of a porous inert support by direct impregnation with a solution of the metal compound which it is desired to incorporate in the surface thereof. In some cases, it may be necessary to prepare the component indirectly by impregnation with one compound followed by a conversion treatment whereby said compound is converted to the desired compound. It is preferred to employ platinum or palladium in the amount of 0.1 to 2 percent by weight deposited on an inert support as the dehydrogenation component of the instant catalyst.

The base material employed to support the dehydrogenation component may be any porous high surface area material capable of operating under the required conditions of reaction and handling and which is catalytically inert under the contemplated reaction conditions, i. e., a material which, when brought into contact at reaction conditions with the charge undergoing conversion would effect substantially no change therein due to its presence. The available surface area of the supporting material should generally be in excess of 10 square meters per gram. Typical of the supporting materials for the dehydrogenation component are silica gel, alumina gel, other oxide gels, natural clays, bauxite, pumice stone, kaolin, charcoal, kieselguhr, porous glass, magnesia, asbestos, coke, magnesium sulfate, etc.

As the acid cracking component, composites, such as silica-alumina, silica-magnesia, silica-zirconia, silica-thoria, silica-beryllia, silica-titania, silica-alumina-magnesia, silica-alumina-zirconia, silica-alumina-thoria, silica-alumina-titania, and silica-alumina-beryllia, may be used; also, halogenated alumina, aluminum halides, and other materials having the ability to catalytically promote cracking activity. In general, it is preferred to employ, as the cracking component, a material having an activity as determined by the CAT-A method of at least about 10. Usually the cracking component employed herein is characterized by a cracking activity (as determined by the CAT-A method) in the range of 20 to 55.

The particle size of the two components making up the instant catalyst mixture may be substantially identical or may vary widely. The particle size of each component, however, is generally within the range of 1–400 mesh (Tyler), but may in some instances be considerably finer in size approaching 1 micron in diameter. For affording a means of ready separation of the catalyst components, as hereinafter described, it is often desirable to employ a mixture wherein the dehydrogenation and cracking components have slightly different particle size.

The conditions under which hydrocarbon conversion in the presence of hydrogen is effected with the present catalyst are those conventionally employed for the particular desired reaction. Generally taking into consideration the charge stock and the extent and direction of desired reaction, conversion is carried out at a temperature between about 500° F. and about 1000° F. The hydrogen pressure employed is between about atmospheric and about 5000 pounds per square inch. The liquid hourly space velocity, i. e. the liquid volume of hydrocarbon per hour per volume of catalyst is between about 0.1 and about 10. Generally, the molar ratio of hydrogen to hydrocarbon charge is between about 1 and about 80. Within the aforementioned ranges, it will be appreciated that there are preferred conversion conditions for a particular operation. Thus, for reforming, the temperature is ordinarily between about 700° F. and about 1000° F. and preferably between about 725° F. and about 975° F. The hydrogen pressure in reforming is ordinarily between about 100 and about 1000 pounds per square inch gauge and preferably between about 350 and about 700 pounds per square inch gauge. The liquid hourly space velocity for reforming is preferably between about 0.5 and about 4 and the ratio of hydrogen to hydrocarbon charge is generally between about 1 and about 20, preferably between about 4 and about 12. For hydrocracking the temperature is ordinarily between about 500° F. and about 750° F. and preferably between about 600° F. and about 750° F. The hydrogen pressure in such operation is ordinarily between about 100 and about 5000 pounds per square inch gauge and preferably between about 350 and about 2500 pounds per square inch gauge. The liquid hourly space velocity for hydrocracking is preferably between about 0.1 and about 4 and the ratio of hydrogen to hydrocarbon charge is generally between about 2 and about 80 and preferably between about 5 and about 50.

The charge stock undergoing conversion in accordance with the present process may be a normally liquid hydrocarbon or mixture consisting predominately of such hydrocarbons. Thus, the hydrocarbon charge stocks treated in accordance with the invention may suitably comprise petroleum fractions including reforming feed stocks of petroleum distillates boiling within the range of 60° F. to 450° F., which range includes naphthas, gasoline, and kerosene; and hydrocracking feed stocks of gas oils generally characterized by an A. P. I. gravity of 32 to 40 and boiling within the range of 300 to 750° F.

The fact that the dehydrogenation and cracking catalyst components utilized in the present mechanical catalyst mixtures have generally different properties on the one hand but are seen to be operable as physically independent or separable entities on the other hand affords a basis for improved hydrocarbon conversion processes, particularly in regard to catalyst regeneration and methods for recovery of the valuable metal constituent of the dehydrogenation component after the same has become catalytically spent.

Particular embodiments of the present invention are shown in the attached drawing wherein:

Figure 1 depicts in schematic form a process wherein a mechanical catalyst mixture of the type described hereinabove is employed for hydrocarbon conversion, the catalyst components thereafter separated, separately regenerated, recombined and returned to the reaction zone.

Figure 2 illustrates in schematic form a process in which a mechanical catalyst mixture of the type described is employed and thereafter the valuable metal constituent of the dehydrogenation component of the catalyst mixture is recovered in an efficient and inexpensive manner.

It is well known that platinum-containing reforming catalysts lose activity gradually upon use as a result of regeneration with air. The treatment with air at an elevated temperature is believed to adversely affect the platinum while it does not, as is well known, affect the activity of acid type cracking catalysts. On the other hand, deactivation of the acid type cracking catalyst is believed to take place as a result of the accumulation of inhibitors and carbonaceous material upon use of such catalyst in hydrocarbon conversion. In one embodiment of the present invention, a mixture of platinum-containing and of acid type cracking catalyst particles is employed in hydrocarbon conversion. The spent catalyst mixture is thereafter separated into its components of platinum-containing particles and cracking catalyst particles by providing such components with a suitable different physical characteristic which permits their ready separation, such as a difference in particle size. Thereafter, the catalyst components are separately regenerated by subjecting the cracking component to regeneration with an oxygen-containing gas, i. e. air for a sufficient time and at a sufficiently elevated temperature to burn carbonaceous material therefrom but under conditions such that sintering of the cracking component is not encountered. Generally these conditions are fulfilled by regenerating in air for a period in the range of about 10 minutes to about 1 hour and a temperature in the approximate range of 1000° F. to 1400° F. The separated platinum-containing dehydrogenation component is subjected to regeneration treatment with hydrogen for a period in the range of 1 to 5 hours at a temperature in the range of 900° F. to 1100° F. After separate regeneration, the components are again mixed and recycled to the reaction zone. Such process may be carried out batch-wise or continuously. A feasible means for effecting such process is shown in detail in Figure 1.

Turning to this figure, the initial mechanical catalyst mixture comprising a dehydrogenation component, such as platinum, deposited on an inert support, and an acid type cracking catalyst is introduced into reactor 10 through conduit 11. The catalyst mixture passing through conduit 11 flows into catalyst feed vessel 12 and thereafter into the upper portion of reactor 10. The hydrocarbon charge is introduced into the lower portion of reactor 10 through conduit 13. Hydrogen is introduced into reactor 10 through conduit 14. With valves 15 and 16 closed, the hydrocarbon charge, maintained in intimate contact with the catalyst mixture and hydrogen, undergoes reaction in reactor 10. After desired conversion of the hydrocarbon charge has been attained, the gaseous reaction products are withdrawn from the reactor through outlet conduit 17. After extended contact at reaction conditions of the hydrocarbon charge and catalyst mixture, the latter becomes spent in that its activity is decreased to the point where further use thereof is not economically feasible. When such point is reached, the catalyst is subjected to regeneration by opening valve 16; the spent catalyst mixture thereupon passes into separating vessel 18. Since the dehydrogenation and cracking components making up the initial catalyst mixture are provided with differing particle size, a sieve plate 19, located in separating vessel 18, serves to physically separate the platinum-containing dehydrogenation component and the cracking component. In the present case, the latter component has a finer particle size than the former component and passes through sieve plate 19 while the platinum-containing component collects thereon. The separated components are thereafter regenerated. The cracking component is removed from the bottom of vessel 18 upon opening valve 20 and passes through conduit 21 to regenerator 22. Valve 20 is thereafter closed and a cracking component contained in regenerator 22 is regenerated by introducing air therein through conduit 23. Gases formed during the regeneration are withdrawn from 22 through outlet 24. After air regeneration of the cracking component, valve 25 is opened and the regenerated catalyst passes through outlet conduit 26 and into conduit 27. The platinum-containing dehydrogenation component which has collected on plate 19 in vessel 18 is removed therefrom upon opening valve 28. The spent platinum-containing catalyst thereupon flows through conduit 29 and into regenerator 30. Valve 28 is thereafter closed and hydrogen is introduced into regenerator 30 through conduit 31, the temperature and pressure conditions in regenerator 30 being so maintained as to afford regeneration of the platinum-containing component. Gases formed during the regeneration are withdrawn from 30 through outlet 32. After regeneration of the platinum-containing dehydrogenation component, valve 33 is opened, permitting the regenerated catalyst to flow through conduit 34 and thereafter through conduit 27 in which the regenerated platinum component is intermingled with the regenerated cracking component. Valve 35 is thereafter opened and the regenerated catalyst components pass into the lower portion of air lift 36.

Air is introduced into the bottom of said lift through conduit 37 and, if desired, through conduits positioned along air lift 36 at various points of differing elevation, such as conduits 38, 39, and 40. The air pressure maintained in lift 36 is such as to elevate the regenerated catalyst components therethrough, recycling such components through conduit 41 to vessel 12. The recycling of the regenerated catalyst components through an air lift is particularly convenient in the present case since the air in such lift serves not only to convey the catalyst particles but also serves to effect intimate admixture of the regenerated catalyst particles during the course of upward flow and also to cool the regenerated catalyst components.

In Figure 2, is shown a process for simplified platinum recovery from a mechanical mixture comprising cracking component and a platinum-containing dehydrogenation component wherein the platinum is deposited on an inert porous carbonaceous base. Turning now more particularly to this figure, a catalyst mixture comprising a cracking component and a dehydrogenation component of platinum deposited on a carbonaceous base, and in which the cracking component is characterized by a smaller particle size than the dehydrogenation component, is introduced through conduit 50 into reactor 51, passing through feed vessel 52. The hydrocarbon charge is introduced into reactor 51 through conduit 53. Hydrogen is introduced into reactor 51 through conduit 54. Valves 55 and 56, being closed, the desired hydrocarbon conversion is effected in 51, and resulting gaseous reaction products are withdrawn through conduit 57. After an extended period of time, the catalyst mixture contained in reactor 51 becomes spent. When such point has been reached, valve 56 is opened, permitting the catalyst mixture to pass into separating vessel 58. The platinum-containing components, being of larger particle size, collect on sieve plate 59 while the cracking component of smaller particle size passes through plate 59 and collects in the bottom of vessel 58. The platinum-containing component is thereafter withdrawn from vessel 58 upon opening valve 60 which permits such component to pass through conduit 61 and into furnace 62. Air is introduced into furnace 62 through conduit 63 and the temperature is raised therein by suitable means not shown sufficiently high to effect combustion of the carbonaceous base. Combustion gases are withdrawn through outlet 64. The residual ash containing the platinum is then withdrawn from furnace 62 upon opening valve 65. The platinum-containing ash passes through conduit 66 to vessel 67 in which it is brought into contact with a suitable acid mixture, such as aqua regia, introduced through conduit 68. The acid serves to dissolve the platinum from the ash. The resulting acid solution of platinum is withdrawn from vessel 67 and forced by pump 69 through conduit 70 to contacting vessel 71. Vessel 71 contains particles of the carbonaceous base previously introduced therein through conduit 72. The acidic platinum-containing solution coming into contact with the carbonaceous particles serves to impregnate the latter. The impregnated particles so obtained are withdrawn from vessel 71 upon opening valve 73 and pass into vessel 74 in which reduction of the impregnated platinum-containing carbonaceous particles is effected by introducing a reducing gas, such as hydrogen, through conduit 75. The conditions maintained in vessel 74 are such as to effect reduction of the platinum-containing impregnated carbonaceous base to a deposition of elemental platinum on the base. The reduced particles are thereafter withdrawn from vessel 74 upon opening valve 76 and pass through conduit 77 to air-lift 78. The cracking component collecting in the bottom of separating vessel 58 may alternatively either be withdrawn therefrom through conduit 79 upon opening valve 80 and thereby being directly conducted to air-lift 78 or the cracking component may undergo air regeneration by opening valve 81, which permits the spent cracking component to pass into regenerator 82. Air is introduced into regenerator 82 through conduit 83 and regeneration gas is withdrawn therefrom through outlet 84. The cracking component, after regeneration, is withdrawn from 82 upon opening valve 85 and passes through conduit 86 to air-lift 78, wherein it is intermingled with the regenerated platinum-containing component. Air is introduced into air-lift 78 through conduit 87 and, if desired, through other outlets positioned along lift 78 at various elevational points thereof, such as inlets 88, 89, and 90. The regenerated cracking component and regenerated platinum-containing component undergo intimate admixing in air-lift 78, the pressure therein being sufficient to elevate the catalyst mixture to the upper portion of the lift, and thereafter through conduit 91 which serves to recycle the catalyst mixture to vessel 52.

The above-described process is advantageous for recovery of platinum from a catalyst bearing the same since a charge of many tons of platinum-containing catalyst, in accordance with the described procedure, is reduced to a matter of pounds of residue, after which platinum recovery can be practiced on a comparatively small scale rather than a plant scale of operation. It is contemplated that any feasible means for recovering platinum from the residual ash may be employed. It is also contemplated that the inexpensive platinum recovery step in the above process may be used to afford operations under conditions where relatively rapid deactivation of the platinum-containing component takes place and which would normally make such operations economically unfeasible due to the expense involved in regeneration or recovery of the platinum-containing catalyst.

The process of the present invention is further applicable to hydrocarbon conversion methods wherein halogenated alumina is employed as the acid cracking component, and platinum deposited on an inert base is employed as the dehydrogenation component. Such catalyst mixture has certain distinct advantages over a conventional platinum-impregnated, halogen-containing alumina catalyst. Thus, air regeneration of platinum catalysts which employ halogenated alumina as the acid base results in loss of catalytic activity. The decrease in catalyst activity is believed due to loss of the halogen by hydrolysis. By employing a mechanical catalyst mixture in accordance with the instant invention, using halogenated alumina as the acid component, such component is regenerable without the loss of activity by initially separating the same from the platinum-containing component and thereafter treating the halogenated alumina base alone with halogen either by direct contact with halogen or a halogen acid or by impregnation with a halide salt and thereafter re-admixing the treated alumina base with the platinum-containing component. By following the foregoing procedure, the dispersed platinum is not subjected to contact with the heating gases or solutions normally employed for regeneration of the conventional platinum-impregnated halogenated alumina catalyst.

The procedures described hereinabove are applicable to catalytic processes in which the catalyst employed is a mechanical mixture made up of two components, one of which exhibits cracking activity and the other of which exhibits dehydrogenation activity. The catalyst mixture may be in the form of discrete particles or the mixture may be in the form of components which have been finely ground, admixed, and pelleted so that each gross particle contains small particles of both components. In the latter case, the mixture may be separated into its components by initially crushing to a particle size comparable to or below the magnitude of the small constituent particles, and thereafter separating the component particles by flotation, air-blowing, sifting, or by any of various other known means for separating physically and/or chemically different materials. The separated cracking and dehydrogenation components may then be separately regenerated by methods set forth hereinabove. Also, platinum or other valuable metal constituent may be recovered therefrom by methods described hereinabove. The particular proportion of cracking component and dehydrogenation component present in the mechanical catalyst mixtures employed in the present process will generally depend on the nature of each of the specific components employed and on the particular reaction in which such catalyst is used. However, the volume ratio of cracking component and dehydrogenation component employed in the mechanical catalyst mixtures described hereinabove will generally be between about 10:1 and 1:10.

It is to be understood that the above description is merely illustrative of preferred embodiments of the invention of which many variations may be made within the scope of the following claims by those skilled in the art without departing from the spirit thereof.

I claim:

1. A method for converting hydrocarbons, which comprises contacting a hydrocarbon charge with a catalyst consisting essentially of a mechanical mixture of a component exhibiting dehydrogenation activity, which component consists of 0.1 to 2 percent by weight of platinum deposited on an inert porous support and an acidic component exhibiting cracking activity, thereafter separating the catalyst mixture into its components, subjecting the separated dehydrogenation component to regeneration in the presence of hydrogen, subjecting the separated cracking component to regeneration in the presence of an oxygen-containing gas, combining the separately regenerated particles and recycling the resulting mixture for further contact with said hydrocarbon charge.

2. A method for converting hydrocarbons, which comprises contacting a hydrocarbon charge with a catalyst consisting essentially of a mechanical mixture of a component exhibiting dehydrogenation activity, which component consists of 0.1 to 2 per cent by weight of platinum deposited on an inert porous support and an acidic component exhibiting cracking activity, thereafter separating the catalyst mixture into its components, subjecting the separated dehydrogenation component to regeneration in the presence of hydrogen at a temperature in the range of 900° F. to 1100° F. for a period between about 1 and about 5 hours, subjecting the separated cracking component to regeneration in the presence of an oxygen-containing gas at a temperature in the range of 1000° F. to 1400° F. for a period between about 10 minutes and about 1 hour, combining the separately regenerated particles and recycling the resulting mixture for further contact with said hydrocarbon charge.

3. A method for converting hydrocarbons, which comprises contacting a hydrocarbon charge with a catalyst consisting essentially of a mechanical mixture of a component exhibiting dehydrogenation activity, which component consists of 0.1 to 2 percent by weight of platinum deposited on a porous carbonaceous base and an acidic component exhibiting cracking activity and thereafter separating the aforesaid catalyst mixture into its components, subjecting the cracking component to regeneration in the presence of an oxygen-containing gas, burning the carbonaceous base from the dehydrogenation component, recovering platinum from the residual ash, impregnating porous carbonaceous particles with said recovered platinum, subjecting the impregnated particles to a reducing atmosphere, combining the particles resulting from such treatment with particles of the regenerated cracking component and recycling the resulting mixture to further contact with said hydrocarbon charge.

4. A method for recovering platinum from a spent platinum-containing catalyst consisting essentially of a mechanical mixture of a component exhibiting dehydrogenation activity, which component consists of a small amount of platinum deposited on a carbonaceous base and an acidic component exhibiting cracking activity, which comprises separating the spent catalyst mixture into its respective components, burning the carbonaceous base from the dehydrogenation component and dissolving platinum from the residual ash product.

5. A method for converting hydrocarbons, which comprises contacting a hydrocarbon charge with a catalyst consisting essentially of a mechanical mixture of a dehydrogenation component which consists of a small amount of a metal selected from the group consisting of platinum and palladium deposited on an inert porous support and an acidic component exhibiting cracking activity, thereafter separating the catalyst mixture into its components, subjecting the separated dehydrogenation component to regeneration in the presence of hydrogen, subjecting the separated cracking component to regeneration in the presence of an oxygen-containing gas, combining the separately regenerated particles and recycling the resulting mixture for further contact with said hydrocarbon charge.

6. A method for converting hydrocarbons, which comprises contacting a hydrocarbon charge with a catalyst consisting essentially of a mechanical mixture of a component exhibiting dehydrogenation activity, which component consists of 0.1 to 2 percent by weight of a metal selected from the group consisting of platinum and palladium deposited on a porous carbonaceous support and an acidic component exhibiting cracking activity, thereafter separating the catalyst mixture into its components, subjecting the separated dehydrogenation component to regeneration in a hydrogen atmosphere, subjecting the separated cracking component to regeneration in the presence of air, combining the separately regenerated particles and recycling the resulting mixture for further contact with said hydrocarbon charge.

7. A method for converting hydrocarbons, which comprises contacting a hydrocarbon charge with a catalyst consisting essentially of a mechanical mixture of a component exhibiting dehydrogenation activity, which component consists of 0.1 to 2 percent by weight of a metal selected from the group consisting of platinum and palladium deposited on a porous carbonaceous base and an acidic component exhibiting cracking activity and thereafter separating the aforesaid catalyst mixture into its components, burning the carbonaceous base from the dehydrogenation component, recovering a metal of the aforesaid group from the residual ash, impregnating porous carbonaceous particles with said recovered metal, subjecting the impregnated particles to a reducing atmosphere, combining the particles resulting from such treatment with the previously separated particles of cracking component and recycling the resulting mixture of further contact with said hydrocarbon charge.

References Cited in the file of this patent

UNITED STATES PATENTS

| 2,134,543 | Andrews | Oct. 25, 1938 |
| 2,325,136 | Kassel | July 27, 1943 |
| 2,353,119 | Workman | July 4, 1944 |
| 2,372,165 | Arveson | Mar. 20, 1945 |
| 2,560,329 | Brandon | July 10, 1951 |
| 2,739,927 | Doumani | Mar. 27, 1956 |
| 2,780,603 | Burton et al. | Feb. 3, 1957 |

FOREIGN PATENTS

| 552,147 | Great Britain | Mar. 24, 1943 |
| 577,862 | Great Britain | June 4, 1946 |

OTHER REFERENCES

"Dictionary of Applied Chemistry," Thorpe, vol. V, page 327 (1924), Longmans and Company.

UNITED STATES PATENT OFFICE
CERTIFICATE OF CORRECTION

Patent No. 2,854,400                                  September 30, 1958

Paul B. Weisz

It is hereby certified that error appears in the printed specification of the above numbered patent requiring correction and that the said Letters Patent should read as corrected below.

Column 4, line 42, Table IV, second column thereof, for "SiO" read -- $SiO_2$ --; column 5, line 20, for "convertion" read -- conversion --; line 37, for "$Al_2O_4$" read -- $Al_2O_3$ --.

Signed and sealed this 27th day of January 1959.

(SEAL)
Attest:
KARL H. AXLINE                                                    ROBERT C. WATSON
Attesting Officer                                        Commissioner of Patents